US012399282B2

(12) United States Patent
Skupin

(10) Patent No.: US 12,399,282 B2
(45) Date of Patent: Aug. 26, 2025

(54) METHOD AND SYSTEM FOR PREDICTING GNSS GEOLOCATION QUALITY ON ROADS IN URBAN ENVIRONMENTS

(71) Applicant: Robert Bosch GmbH, Stuttgart (DE)

(72) Inventor: Christian Skupin, Garbsen (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 18/318,056

(22) Filed: May 16, 2023

(65) Prior Publication Data

US 2023/0375717 A1  Nov. 23, 2023

(30) Foreign Application Priority Data

May 17, 2022 (DE) ...................... 10 2022 204 842.3

(51) Int. Cl.
*G01S 19/26* (2010.01)
(52) U.S. Cl.
CPC .................................... *G01S 19/26* (2013.01)
(58) Field of Classification Search
CPC ........ G01S 19/26; G01S 19/14; G01S 19/396; G01S 19/22; G01S 19/42; G01S 19/40; G01C 21/3415
See application file for complete search history.

(56) References Cited

U.S. PATENT DOCUMENTS

2022/0276394 A1\* 9/2022 Niesen .................... G01S 19/28

\* cited by examiner

*Primary Examiner* — Alan D Hutchinson
(74) *Attorney, Agent, or Firm* — Maginot, Moore & Beck LLP

(57) ABSTRACT

A method for predicting GNSS geolocation quality on roads in urban environments given the propagation of objects obstructing GNSS signals is disclosed. The method includes step a) providing a model for determining the at least one geolocation quality parameter as a function of input values, wherein the model is designed for at least the following input values: (i) at least one DOP value describing the quality of the present geometrical satellite constellation under line-of-sight conditions, and (ii) at least one characteristic environmental parameter considered in the model independently of the DOP value and describing a local influence of objects on the propagation of GNSS signals. The method further includes step b) determining a location and/or a time at which location and/or time the GNSS geolocation quality is to be predicted. In addition, the method includes step c) determining at least one DOP value at a given time as a function of the location of the GNSS receiver provisionally determined in step b) and providing the DOP value as an input value to the model. The method also includes step d) determining at least one characteristic environmental parameter as a function of the location provisionally determined in step b) and providing the at least one environmental parameter as an input value to the model. Also, the method includes step e) calculating at least one quality parameter describing the quality of a GNSS geolocation using the model provided in step a) as a function of the parameters provided in steps c) and d).

15 Claims, 2 Drawing Sheets

METHOD AND SYSTEM FOR PREDICTING GNSS GEOLOCATION QUALITY ON ROADS IN URBAN ENVIRONMENTS

This application claims priority under 35 U.S.C. § 119 to application no. DE 10 2022 204 842.3, filed on May 17, 2022 in Germany, the disclosure of which is incorporated herein by reference in its entirety.

BACKGROUND

The present disclosure relates to a method for predicting GNSS geolocation quality on roads in urban environments. In particular, the disclosure relates to a locating system for a vehicle for performing the method.

Automated driving places very high demands on geolocation. Geolocation can be performed by the reception of GNSS signals. Safe operation during automated driving therefore requires high GNSS geolocation quality, which is characterized by both high GNSS geolocation accuracy and high GNSS availability.

It is known that GNSS signal availability can be predicted based on the application of 3D building models and knowledge of the GNSS satellite constellation. Using a ray-tracer, the propagation of GNSS signals and the line-of-sight between GNSS satellites and an assumed receiver position can be calculated, taking into account the 3D building models. Furthermore, the dilution of precision (DOP) can be calculated as a qualitative measure of control width or geolocation accuracy, or optionally from the knowledge of predicated visible GNSS satellites for a receiver at a particular location at a specific time. Typically, for example, the horizontal dilution of precision (HDOP) can also be used in order to describe geolocation accuracy influence in the horizontal plane. Using the approaches known from geodesy, $E_{pos}=UERE*DOP$ or $E_{pos\_horizontal}=UERE*HDOP$, the GNSS positioning error $E_{pos}$ and the horizontal GNSS positioning error $E_{pos\_horizontal}$ can be estimated, in which case UERE corresponds to the user equivalent range error and describes the receiver characteristic.

In these known approaches, however, the impairment of GNSS geolocation accuracy through multi-path effects is not sufficiently considered. This is particularly disadvantageous in urban settings, where there are many buildings that prevent the processing of GNSS signals and thus can severely compromise GNSS geolocation accuracy.

Therefore, there is a desire to specify a method for predicting GNSS geolocation quality, which takes into account not only the GNSS signal availability but also the factors relevant to the multi-path effects, in particular the dimensions and arrangements of buildings.

SUMMARY

Contributing to this is a method for predicting GNSS geolocation quality on roads in urban environments given the propagation of objects obstructing GNSS signals, comprising the following steps:
a) providing a model for determining the at least one geolocation quality parameter as a function of input values, the model being designed for at least the following input values:
  at least one DOP value describing the quality of the present geometrical satellite constellation under line-of-sight conditions,
  at least one characteristic environmental parameter considered in the model independently of the DOP value and describing a local influence of objects on the propagation of GNSS signals,
b) determining a location and/or a time at which location and/or time the GNSS geolocation quality is to be predicted,
c) determining at least one DOP value at a given time as a function of the location of the GNSS receiver provisionally determined in step b) and providing the DOP value as an input value to the model,
d) determining at least one characteristic environmental parameter as a function of the location provisionally determined in step b) and providing the at least one environmental parameter as an input value to the model,
e) calculating at least one quality parameter describing the quality of a GNSS geolocation using the model provided in step a) as a function of the parameters provided in steps c) and d).

Using the method described, a GNSS geolocation quality can be predicted not only by taking into account the GNSS signal availability, but also by taking into account the multi-path reception caused by the building. As a result, GNSS geolocation quality can be more precisely predicted in urban environments with many buildings. This is particularly advantageous, e.g., for GNSS-based automated driving, and enables a preliminary check, e.g., as to whether a planned path or, better, a different path is to be traveled.

In particular, a GNSS signal in this context means the signal transmitted from a satellite of a Global Navigation Satellite System (GNSS), e.g., GPS, GLONASS, Galileo, or Beidou. During propagation, a GNSS signal can be diverted by reflectors, such as buildings, and can arrive at the GNSS receiver via a variety of paths. This phenomenon is referred to as multi-path reception and significantly influences GNSS geolocation accuracy, especially in urban environments.

The GNSS signal availability for GNSS geolocation quality is to be considered in addition to multi-path reception. The GNSS signal availability in this case describes how many GNSS signals can be received at one location at a time under line-of-sight conditions (referred to hereinafter as "LOS conditions"). In order to calculate a GNSS position, a minimum GNSS signal availability is required. Typically, geolocation occurs by receiving at least four GNSS signals.

The term "line-of-sight" is used in communications technology regarding a radio transmission with direct visual contact between transmitter and receiver. In this context, the term "receiving a GNSS signal under line-of-sight conditions" thus means that the GNSS signal is received under line-of-sight connection between the GNSS receiver and the GNSS satellite that sent this GNSS signal.

This is true because, in urban settings, there are many buildings as reflectors, so that GNSS signals may be received as a combination of the GNSS line-of-sight signal (i.e., GNSS signal under line-of-sight conditions) with the various time-staggered echo signals reflected by buildings or as signals only from the echo signals reflected by buildings. Further, the LOS portion of the received satellite signal can be blocked so that only non-line-of-sight (NLOS) signal portions are received, i.e., those that are received via reflections/diffraction or scattering rather than via a direct line-of-sight connection. This can mean that the less GNSS signals are received under line-of-sight conditions, i.e., the lower the GNSS signal availability the greater the risk of receiving GNSS signals affected by multi-path effects.

In order to better predict GNSS geolocation quality in urban environments, both GNSS signal availability and multi-path reception must be considered in this case.

According to step a), there is provided a model for determining the at least one geolocation quality parameter as a function of input values, the model being designed for at least the following input values:
- at least one DOP value describing the quality of the present geometrical satellite constellation under line-of-sight conditions,
- at least one characteristic environmental parameter considered in the model independently of the DOP value and describing a local influence of objects on the propagation of GNSS signals, In this case, a heuristic model as compact as possible is to be provided for highly precise prediction of GNSS geolocation accuracy, taking into account GNSS signal availability and multi-path reception in urban canyons.

To provide the model, the relationships between geolocation errors and various influencing factors can be determined. The relations determined can be parameterized by coefficients and functions. As a result, the influencing factors can enter the model as input values after provision of the model in step b) to step d) in order to determine the geolocation error, the geolocation accuracy, and the associated geolocation quality, e.g., in the form of the at least one geolocation quality parameter as the starting values of the model in step e). The influencing factors are in particular:
- at least one DOP value describing the quality of the present geometrical satellite constellation under line-of-sight conditions,
- at least one characteristic environmental parameter considered in the model independently of the DOP value and describing a local influence of objects on the propagation of GNSS signals.

In this case, the at least one DOP value is relevant to the GNSS availability, and the at least one characteristic environmental parameter is relevant to the multi-path effect.

A DOP value is a quality measure of the available GNSS signals under line-of-sight conditions and describes how well suited the GNSS satellites that radiated these available GNSS signals are for geolocation in relation to one another at a given location. A DOP value is thus dependent on the relative position of these GNSS satellites to one another and to the GNSS receiver. The relative position of GNSS satellites to one another is referred to herein as the geometry of the GNSS satellites. The lower a DOP value, the better the geometry of the GNSS satellites is for geolocation. A very good EPO value can be greater than zero and less than one. DOP values greater than a specified threshold value that is greater than 1, e.g. 5 or 10, do not enable an evaluation. In particular, the horizontal portion of the DOP value (HDOP), i.e., DOP values at the horizontal level, is taken into account under line-of-sight conditions.

A characteristic environmental parameter can be dimensions and arrangements of buildings that can cause the multi-path reception of GNSS signals. It is possible to introduce a form factor $m_{ff}$ with respect to a 10-meter reference urban canyon. The reference urban canyon describes the most common two-lane urban canyon in urban environments.

It is possible to define the form factor $m_{ff}$ using exemplary Formula (1).

$$m_{ff} = \frac{W_{UC}}{10 \text{ m}} \qquad (1)$$

In Formula (1), the term $W_{UC}$ corresponds to the width of an urban canyon and thus the form factor $m_{ff}$ corresponds to the ratio between the width of the urban canyon $W_{UC}$ and the width of a reference urban canyon of 10 meters. At $m_{ff}=1$, this can mean that the width of an urban canyon is 10 meters, while at $m_{ff}$ at =2, the width of an urban canyon is 20 meters. At $m_{ff}=0$, this can mean that the GNSS signals are thus received under line-of-sight conditions without impairments of urban canyons (i.e., the GNSS signals are not obscured by buildings of the urban canyons).

In order to determine the aforementioned relations, it is possible that the model is parameterized based on GNSS signals and test data relevant for different urban canyon situations. The GNSS signals can in this case be simulated by a GNSS signal generator. The test data, e.g., building height, urban canyon width, etc., can be obtained from measurements in the real field or can also be simulated by a simulator. By means of a GNSS receiver (e.g., a ublox F9 receiver), geolocation results or geolocation accuracy can be analyzed based on the simulated and/or measured GNSS signals and test data, respectively.

For example, coefficients relevant to the relation between geolocation errors and various influencing factors can be provided by the simulated and/or measured GNSS signals and test data as follows.

A first coefficient describes the ratio between the geolocation error and the DOP value. As an example, the first coefficient to describe the ratio between the geolocation error and the HDOP value under line-of-sight conditions can be provided by exemplary Formula (2):

$$c_{\frac{\sigma_{LOS}}{HDOP}} = \frac{\sigma_{RMS|LOS,m_{ff}=0}}{HDOP} \qquad (2)$$

In Formula (2) the term $$c_{\frac{\sigma_{LOS}}{HDOP}}$$

corresponds to the first coefficient, and the term $\sigma_{RMS|LOS, m_{ff}=0}$ corresponds to the geolocation error, which can be determined by simulated and/or measured GNSS signals and test data under line-of-sight conditions. The term HDOP corresponds to the HDOP value which can be specified according to the location and time information of a GNSS. The first coefficient can be provided at $m_{ff}=0$. The first coefficient is particularly relevant to the geolocation error as a function of the GNSS signal availability, in particular the geometry of the available GNSS satellite.

A second coefficient describes the ratio between the locating error, taking into account the multi-path reception on a reference urban canyon (i.e., $m_{ff} \neq 0$) and the geolocation error, without taking into account the multi-path reception (i.e., $m_{ff}=0$).

The second coefficient can be provided by the exemplary Formula (3):

$$c_{\frac{\sigma_{MP}}{\sigma_{LOS}}}\bigg|_{m_{ff_{min,sim}}} = \frac{\sigma_{RMS|MP, m_{ff_{min,sim}}}}{\sigma_{RMS|LOS, m_{ff}=0}} \qquad (3)$$

In Formula (3), the term $$c_{\frac{\sigma_{MP}}{\sigma_{LOS}}}|_{m_{ffmin,sim}}$$

corresponds second coefficient, and the term $$\sigma_{RMS|MP,m_{ffmin,sim}}$$

corresponds to the geolocation error, taking into account multi-path reception (i.e., $m_{ff} \neq 0$, in this case $m_{ff}=1$ is considered in particular), and the term $\sigma_{RMS|LOS,m_{ff=0}}$ corresponds to the geolocation error without taking into account multi-path reception (i.e., under LOS conditions, $m_{ff}=0$). The second coefficient is particularly relevant to the geolocation error as a function of form factors (i.e., characteristic environmental parameters).

To quantify the effect of different urban canyons on geolocation errors, it is also possible to provide a third coefficient $$c_{\sigma_{MP},m_{ff}}|\sigma_{MP m_{ffmin,sim}}$$

for describing the gradients of the geolocation error with an increasing form factor $m_{ff}$. The third coefficient can be derived from the ratio between geolocation errors with increasing shape factors (e.g., $m_{ff}=2, 3, 4, 5$ oder 6) and the geolocation error at $m_{ff}=1$ below the same GNSS availability and geometry of the available GNSS satellites.

The above coefficients are additionally provided, taking into account the property of the GNSS receiver used for geolocation. Accordingly, the coefficients provided should be adjusted with respect to the different manufacturers of GNSS receivers.

After the model is provided in step a), input values are provided in accordance with step b) to d), which can be incorporated into the model provided, so in step e) at least one quality parameter is calculated with the coefficients provided above.

According to step b), a location and/or time are determined, at which location and/or time the GNSS geolocation quality is to be predicted. It is also possible that the location at which the geolocation accuracy is to be predicted can be specified. The time can be specified in exactly the same manner. Regarding the time, a time point or a time window can be selected. As a result, the model provided in step a) with input values determined in step b) and step c) can provide a predictive value that is valid for a time average (for the selected time window).

According to step c), at least one DOP value is determined at a given time as a function of the location of the GNSS receiver determined in step b), and the DOP value is provided as an input value to the model. This can mean that, in step c), a DOP value is determined as the input value only by consideration of LOS satellites. In other words, the satellites are not obstructed by buildings, and there is a direct line of sight between the satellites and the GNSS receiver. The LOS satellites can, e.g., be determined using a 3D building model.

According to step d), at least one characteristic environmental parameter is determined as a function of the location provisionally determined in step b) and provided as an input value to the model. The possible input values specified hereinabove can also be used in order to detail the model's parameter representation and to consider it as an additional dependency with the aim of increasing the accuracy of the predicted GNSS geolocation.

According to step e), at least one quality parameter is calculated, which describes the quality of a high-precision GNSS geolocation using the model provided in step a) as a function of the parameters provided in steps c) and d).

The method described improves the prediction of GNSS geolocation qualities, particularly in urban environments with buildings forming urban canyons, and is particularly suited for automated driving, the positioning and navigation of which are accomplished by receiving GNSS signals via a GNSS receiver. Using the method described, it is possible to check in advance whether an already planned path or, better, a different path is to be traveled.

It is preferred when the model provided in step a) features a first conversion function for converting DOP values into a receiver-based measure of GNSS geolocation quality.

It is also preferred when the model provided in step a) features a second conversion function for converting at least one environmental parameter into a geolocation quality parameter.

It is particularly preferred when the model provided in step a) features a scaling function to scale the at least one environmental parameter.

The first conversion function is designed in particular for a DOP value under line-of-sight conditions as an input value in the model and serves to convert the DOP value into an intuitive measure for assessing GNSS geolocation quality. In this case, only the GNSS signals under line-of-sight conditions and the geometry of the affected GNSS satellites are considered. For example, with the first conversion function, a DOP value can be converted into the GNSS geolocation accuracy in units of meters, so that the DOP value becomes more intuitive to the user. For example, the first conversion function can refer to a constant coefficient (e.g., the first coefficient), or, for example, to a function depending on the DOP value. This can mean that the conversion function can depend on the receiver characteristic (e.g., UERE). That is to say, with another GNSS receiver under identical geometry of the GNSS satellites, a different GNSS geolocation accuracy can be predicted.

The second conversion function is designed in particular for at least one environmental parameter as an input value in the model and serves to convert the at least one environmental parameter into a geolocation quality parameter, e.g., an error term with respect to the multi-path reception. The second conversion function can be based on a constant coefficient (e.g., the second coefficient) or on a function depending on DOP, HDOP values, and/or environmental parameters, e.g., the direction in which the urban canyon extends.

The scaling function can be used in order to model the intensity of the influence of the GNSS geolocation accuracy with respect to interference by multi-path reception. The proportionality of the urban canyon width and the building height can thereby be obtained. The actual dimensions of buildings or canyons are scaled using a scaling factor (e.g., the form factor according to Formula (1)). The scaling function can refer to a constant coefficient (e.g., the third coefficient), a function depending on a form factor, and/or a function depending on other input values such as HDOP or the direction of extension of the urban canyon.

It is possible that the first conversion function, the second conversion function, and the scaling function can be performed independently of one another. For example, the result calculated with the scaling function can therefore be introduced into the second conversion function, and furthermore, the error term converted with the second conversion function can be introduced into the first conversion function for calculating the GNSS geolocation accuracy.

The interaction between the conversion functions and the scaling function as well as the coefficients provided in step a) can be represented by the following exemplary formulas.

$$\sigma_{RMS|LOS,m_{ff}=0} = c_{\frac{\sigma_{LOS}}{HDOP}} \cdot HDOP \tag{4}$$

In Formula (4), the term $\sigma_{RMS|LOS,m_{ff}=0}$ corresponds to the geolocation error solely under LOS conditions, and the term $$c_{\frac{\sigma_{LOS}}{HDOP}}$$

corresponds to the first coefficient provided in step a). Using Formula (4), a geolocation error can only be determined under LOS conditions (i.e., without consideration of the multi-path reception).

$$\sigma_{RMS|MP,m_{ff_{min,sim}}} = \tag{5}$$

$$c_{\frac{\sigma_{MP}}{\sigma_{LOS}}}\bigg|_{m_{ff_{min,sim}}} \cdot \sigma_{RMS|LOS,m_{ff}=0} = c_{\frac{\sigma_{MP}}{\sigma_{LOS}}}\bigg|_{m_{ff_{min,sim}}} \cdot c_{\frac{\sigma_{LOS}}{HDOP}} \cdot HDOP$$

In Formula (5), the term $$\sigma_{RMS|MP,m_{ff_{min,sim}}}$$

corresponds to the geolocation error, taking into account the multi-path reception, and the term $$c_{\frac{\sigma_{MP}}{\sigma_{LOS}}}\bigg|_{m_{ff_{min,sim}}}$$

corresponds to the second coefficient provided in step a). Using Formula (5), a geolocation error can be determined, taking into account the multi-path reception. In this example, Formula (5) is dependent on the result of Formula (4). It is also possible to set the form factor $m_{ff_{min,sim}}$ in Formula (5) to $m_{ff=1}$ such that geolocation errors can also be determined in different urban canyons with different form factors with the following exemplary formulas (6) to (9).

$$\sigma_{RMS(m_{ff})} = \begin{cases} f_1(m_{ff}), \ 0 \le m_{ff} \le m_{ff_{min,sim}} = 1 \\ f_2(m_{ff}), \ m_{ff} \ge m_{ff_{min,sim}} = 1 \end{cases} \tag{6}$$

$$f_1(m_{ff}) = \sigma_{RMS|LOS,m_{ff}=0} + \frac{\left(\sigma_{RMS|MP,m_{ff_{min,sim}}} - \sigma_{RMS|LOS,m_{ff}=0}\right)}{m_{ff_{min,sim}}} \cdot m_{ff} = \tag{7}$$

$$\sigma_{RMS|LOS,m_{ff}=0} + \left(\sigma_{RMS|MP,m_{ff_{min,sim}}} - \sigma_{RMS|LOS,m_{ff}=0}\right) \cdot \frac{m_{ff}}{m_{ff_{min,sim}}} =$$

$$c_{\frac{\sigma_{LOS}}{HDOP}} \cdot HDOP + \left(\sigma_{RMS|MP,m_{ff_{min,sim}}} - \sigma_{RMS|LOS,m_{ff}=0}\right) \cdot \frac{m_{ff}}{m_{ff_{min,sim}}} =$$

$$c_{\frac{\sigma_{LOS}}{HDOP}} \cdot HDOP + \left(c_{\frac{\sigma_{MP}}{\sigma_{LOS}}}\bigg|_{m_{ff_{min,sim}}} \cdot c_{\frac{\sigma_{LOS}}{HDOP}} \cdot HDOP - c_{\frac{\sigma_{LOS}}{HDOP}} \cdot HDOP\right) \cdot$$

$$\frac{m_{ff}}{m_{ff_{min,sim}}} = c_{\frac{\sigma_{LOS}}{HDOP}} \cdot HDOP \left[1 + \left(c_{\frac{\sigma_{MP}}{\sigma_{LOS}}}\bigg|_{m_{ff_{min,sim}}} - 1\right) \cdot \frac{m_{ff}}{m_{ff_{min,sim}}}\right]$$

$$f_2(m_{ff}) = f_0 + c_{\sigma|\Delta m_{ff},HDPO} \cdot HDPO \cdot m_{ff} \tag{8}$$

$$f_0 = \sigma_{RMS|MP,m_{ff_{min,sim}}} - c_{\sigma|\Delta m_{ff},HDPO} \cdot HDOP \cdot m_{ff_{min,sim}} = \tag{9}$$

$$c_{\frac{\sigma_{MP}}{\sigma_{LOS}}}\bigg|_{m_{ff_{min,sim}}} \cdot c_{\frac{\sigma_{LOS}}{HDOP}} \cdot HDOP - c_{\sigma|\Delta m_{ff},HDPO} \cdot HDOP \cdot m_{ff_{min,sim}}$$

In Formula (8), the term $c_{\sigma|\Delta m_{ff},HDPO} \cdot HDPO$ HDOP corresponds to the gradient of the geolocation error with increasing form factor $m_{ff}$, i.e., the third coefficient provided in step a).

In Formula (5), the function $f_1(m_{ff})$ is effective for $0 \le m_{ff} \le m_{ff_{min,sim}}$ and therefore represents the transition of the geolocation error at the smallest form factor $m_{ff_{min,sim}}$, which can be obtained in a converging manner by taking the multi-path reception in urban environments into account along with the geolocation error under purely LOS conditions (i.e., $m_{ff=0}$) and beneath the same visible GNSS satellite. The function $f_1(m_{ff})$ is approximated in this case as a linear function.

The function $f_2(m_{ff})$ describes a geolocation error in urban environments, taking into account the multi-path reception caused only by the scaling of the building geometry of the urban canyons (i.e., $m_{ff} \ge m_{ff_{min,sim}} = 1$)).

The coefficients used in the above formulas are additionally provided, taking into account the property of the GNSS receiver used for geolocation. Accordingly, the coefficients provided should be adjusted to the different manufacturers of GNSS receivers.

It is preferred when the model provided in step a) is read from a memory and was obtained in advance by test measurements and/or simulations.

As described above, the basic coefficients of the model can be learned, calculated, or calibrated from test data. This can be test data from measurements in the real field and/or simulated test data. Simulated test data can be generated by, e.g., combining a GNSS signal generator (which is capable of considering multi-path processing in an urban canyon environment) and using this simulated signal in a GNSS receiver that calculates the position for the simulated signals. Given knowledge of the true position, the associated position error can be calculated. Using the knowledge of the input values for the model as well as the resulting position error, the parameters of the model can be determined empirically. Alternatively, the artificial intelligence methods can be utilized (e.g., artificial neural networks) to determine the parameters of the model and/or the predicted GNSS geolocation accuracy from the inputs.

It is preferred when the DOP value is an HDOP value, a VDOP value, a GDOP value, or a PDOP value.

Similar to the HDOP value acting as an input value as described above, a VDOP value (vertical dilution of precision), a GODP value (geometric dilution of precision), or a PDOP value (positional dilution of precision) for highly precise prediction of the GNSS geolocation accuracy can also be considered.

It is preferred when the at least one characteristic environmental parameter is the width of an urban canyon or the height of the building of the urban canyon.

It is also preferred when the at least one characteristic environmental parameter is the azimuth direction of an urban canyon.

In different azimuth directions of urban canyons, the multi-path reception can vary in its impairment of the GNSS geolocation accuracy. This is because, from the receiver's perspective, in the northern part of the sky image, fewer GNSS satellites can be seen when the receiver is located in the northern hemisphere.

The urban canyons can be distinguished into two groups by their azimuth directions, i.e., the north-south urban canyons and the east-west urban canyons. As a result, the first, second and third coefficients can be considered and provided separately in step a) for the two groups. It is also possible to apply the mean value from the two groups for the respective coefficient.

It is preferred when the at least one characteristic environmental parameter is the distance between the GNSS receiver and the left and right side of the urban canyon.

The distance between the GNSS receiver and the left and right sides of the urban canyon describes the position of the GNSS receiver transverse to the urban canyon (e.g., traffic lane information).

When the GNSS receiver is located in the middle of the urban canyon, the multi-path reception can vary in its impairment of the GNSS geolocation accuracy.

In this case, two groups can be distinguished, i.e., the GNSS receiver position in the center of the urban canyon (i.e., equal distance between the GNSS receiver and the left and right) and the GNSS receiver position not in the center of the urban canyon. As a result, the first, second, and third coefficients in step a) can be considered and provided separately for the two groups or, for example, in lane-based groups. It is also possible to apply the mean value from the two (or possibly several) groups for the respective coefficient.

It is preferred when, after step e), a GNSS geolocation is performed when, in step e), the at least one quality parameter is output that reaches a specified upper or lower limit.

For example, the at least one quality parameter as a starting value of the model can be a geolocation accuracy or a geolocation error predicted using the model provided in step a) and according to the input values in steps c) and d), in which case the input values correspond to the location and/or the time in step b). If the predicted geolocation accuracy drops below a required geolocation quality or the predicted geolocation error exceeds a maximum allowable geolocation error, the input values for GNSS geolocation can be predicted to be unavailable. In this case, for example, a different, better path can be followed.

It is preferred when a control device is configured to have at least one processor for performing the method described.

It is also preferred when a computer program comprising commands is used to perform a method described herein. In other words, this aspect relatives in particular to a computer program (product) comprising commands that, when the program is executed by a computer, prompt the latter to perform a method described herein.

Also preferred is the use of a machine-readable storage medium, on which the computer program proposed herein is stored. Conventionally, the machine-readable storage medium is a computer-readable disk.

It is particularly preferred when the locating system for a vehicle is configured to perform a method described herein.

BRIEF DESCRIPTION OF THE DRAWINGS

The solution presented herein and the technical environment thereof are explained in greater detail hereinafter with reference to the drawings. It should be noted that the disclosure is not intended to be limited by the exemplary embodiments disclosed. In particular, unless explicitly stated otherwise, it is also possible to extract partial aspects of the factual subject matter explained in the drawings and to combine them with other components and/or insights based on other drawings and/or the present description. Schematically shown are.

DETAILED DESCRIPTION

Figure 1:
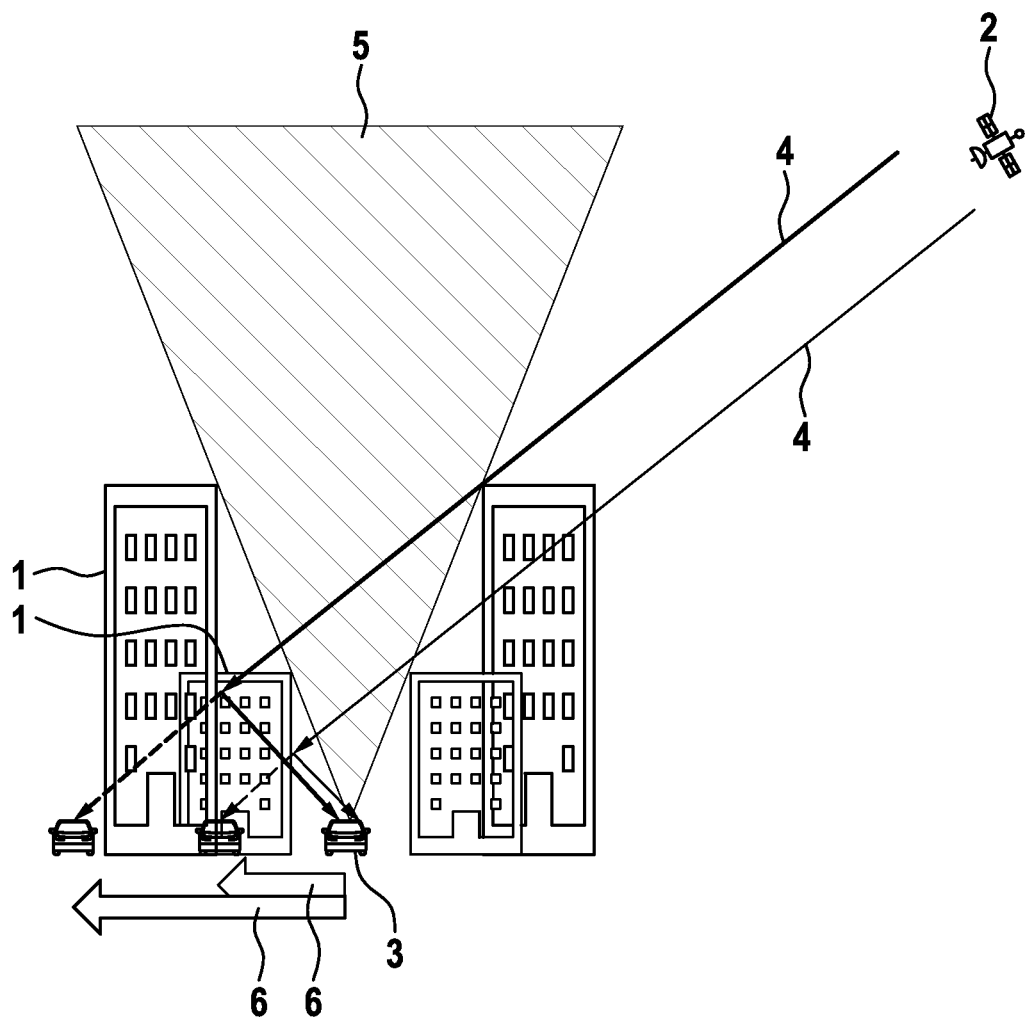
FIG. 1 a multi-path reception in different urban canyons and in a same field of view of GNSS satellites, and FIG. 2 a sequence of a method for predicting GNSS geolocation quality on roads in urban environments given the propagation of objects obstructing GNSS signals during a regular operational sequence.

FIG. 1 schematically shows how the shape of an urban canyon formed by buildings 1 influences the geolocation error 6 due to the multi-path reception. As shown in FIG. 1, two urban canyons having different widths are located in a same field of view 5 with respect to an available GNSS satellite 2, such that the distance between a GNSS receiver (not shown) in a vehicle 3 and a side (e.g., the left side) of the two urban canyons is also different. In this case, the geolocation errors 6 are also different when the GNSS satellite 2 is on the right side of the GNSS receiver, and the GNSS signals 4 are radiated from the GNSS satellite 2 and reflected from the left buildings 1 of the urban canyons and subsequently received by the GNSS receiver, and, specifically in the case shown in FIG. 1, the greater the distance the greater the geolocation error 6.

Figure 2:
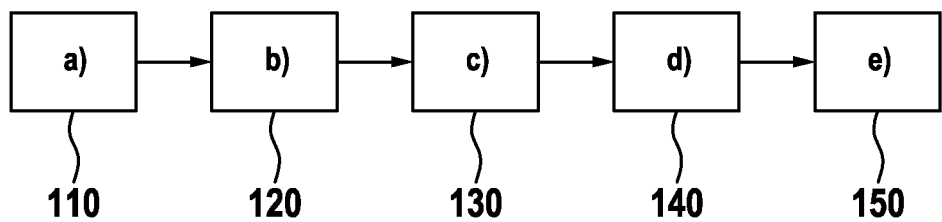

FIG. 2 schematically illustrates a sequence of a method for predicting GNSS geolocation quality on roads in urban environments given the propagation of objects obstructing GNSS signals during a regular operational sequence. The illustrated sequence of the method steps a), b), c), d), and e) with the blocks 110, 120, 130, 140, and 150 is merely exemplary. In block 110, there is provided a model for determining the at least one geolocation quality parameter as a function of input values. In block 120, a location and/or time is determined, at which location and/or time the GNSS geolocation quality is to be predicted. In block 130, at least one DOP value is determined at a given time as a function of the location of the GNSS receiver provisionally determined in step b), and the DOP value is provided as an input value to the model. In block 140, at least one characteristic environmental parameter is determined as a function of the location provisionally determined in step b), and the at least one environmental parameter is provided as an input value to the model. In block 150, at least one quality parameter is calculated, which describes the quality of a high-precision GNSS geolocation using the model provided in step a) as a function of the parameters provided in steps c) and d).

In particular, the model is provided in step a) as a function of the following input values:
at least one DOP value describing the quality of the present geometrical satellite constellation under line-of-sight conditions,
at least one characteristic environmental parameter considered in the model independently of the DOP value and describing a local influence of objects on the propagation of GNSS signals.

It is also possible to check, after performing steps a) to e), whether the planned path or, better, a different path is to be traveled, in which the positioning accuracy predicted using steps a) to e) is compared to a required geolocation accuracy or the predicted geolocation error is compared to a maximum allowable geolocation error.

Using the method described, a GNSS geolocation quality can be predicted not only by taking into account the GNSS signal availability, but also by taking into account the multi-path reception caused by the building. As a result, GNSS geolocation quality can be more precisely predicted in urban environments with many buildings. This is particularly advantageous for the GNSS-based automated driving and enables a preliminary check as to whether a planned path or, better, a different path is to be traveled.

What is claimed is:

1. A method for predicting Global Navigation Satellite System (GNSS) geolocation quality on roads in urban environments given a propagation of objects obstructing GNSS signals, comprising:
  a) providing a model for determining at least one geolocation quality parameter as a function of input values, wherein the input values at least include:
    at least one dilution of precision (DOP) value describing the quality of a present geometrical satellite constellation under line-of-sight conditions, and
    at least one characteristic environmental parameter considered in the model independently of the DOP value and describing a local influence of the objects on the propagation of the GNSS signals;
  b) determining a location and/or a time at which location and/or time the GNSS geolocation quality is to be predicted;
  c) determining at least one DOP value at a given time as a function of the location provisionally determined in step b) and providing the DOP value as an input value to the model;
  d) determining the at least one characteristic environmental parameter as a function of the location provisionally determined in step b) and providing the at least one environmental parameter as an input value to the model;
  e) calculating at least one quality parameter describing the quality of a GNSS geolocation of a vehicle using the model provided in step a) as a function of the parameters provided in steps c) and d); and
  performing an autonomous driving operation of the vehicle taking into account the at least one quality parameter.

2. The method according to claim 1, wherein the model provided in step a) features a first conversion function for converting DOP values into a receiver-based measure of geolocation quality.

3. The method according to claim 1, wherein the model provided in step a) features a second conversion function for converting at least one environmental parameter into a geolocation quality parameter.

4. The method according to claim 1, wherein the model provided in step a) features a scaling function to scale the at least one environmental parameter.

5. The method according to claim 1, wherein the model provided in step a) is read from a memory and was obtained in advance by test measurements and/or simulations.

6. The method according to claim 1, wherein the DOP value is a horizontal dilution of precision (HDOP) value, a vertical dilution of precision (VDOP) value, a geometric dilution of precision (GODP) value, or a positional dilution of precision (PDOP) value.

7. The method according to claim 1, wherein the at least one characteristic environmental parameter is a width of an urban canyon or a height of a building of the urban canyon.

8. The method according to claim 1, wherein the at least one characteristic environmental parameter is an azimuth direction of an urban canyon.

9. The method according to claim 1, wherein the at least one characteristic environmental parameter is a distance between a GNSS receiver and a left and/or right side of an urban canyon.

10. The method according to claim 1, wherein, after step e), a GNSS geolocation is performed when, in step e), the at least one quality parameter is output that reaches a specified upper or lower limit.

11. A control device comprising at least one processor configured to perform a method according to claim 1.

12. A non-transitory computer program product comprising commands that, when the non-transitory computer program product is executed by a computer, prompt the computer to perform the method according to claim 1.

13. A non-transitory computer-readable storage medium comprising commands that, when executed by a computer, prompt the computer to perform the method according to claim 1.

14. A locating system for the vehicle configured to perform a method according to claim 1.

15. The method according to claim 1, the performing an autonomous driving operation further comprising:
  operating the vehicle to travel along a different path compared to a previously planned path.

* * * * *